United States Patent [19]
Vorih

[11] 3,989,780
[45] Nov. 2, 1976

[54] MODULATING NOISE PRODUCED BY ROTATING BODIES

[75] Inventor: William J. Vorih, Denver, Colo.

[73] Assignee: The Gates Rubber Company, Denver, Colo.

[22] Filed: May 5, 1975

[21] Appl. No.: 574,801

Related U.S. Application Data

[62] Division of Ser. No. 176,460, Aug. 31, 1971, Pat. No. 3,926,238.

[52] U.S. Cl. ............................. 264/40.1; 73/146; 73/552; 156/64; 264/326; 425/29
[51] Int. Cl.² ................. B29H 5/02; G01M 17/02
[58] Field of Search ............ 264/40, 315, 326, 36, 264/219; 152/209 R; 73/146, 552; 425/29; 156/64

[56] References Cited
UNITED STATES PATENTS

| | | | |
|---|---|---|---|
| 2,006,197 | 6/1935 | Ewart et al. | 152/209 R |
| 2,808,867 | 10/1957 | Buddenhagen et al. | 152/209 R |
| 3,023,798 | 3/1962 | Moore et al. | 152/209 R |
| 3,535,536 | 10/1970 | Pernau | 73/146 X |

Primary Examiner—Jan H. Silbaugh
Attorney, Agent, or Firm—Curtis H. Castleman, Jr.; Raymond Fink; H. W. Oberg, Jr.

[57] ABSTRACT

Noise produced by a rotating apparatus having radially extending, spaced, load carrying elements, e.g. the tread design portions of a tire, is modulated by selectively pitching and sequencing load carrying elements. The array of load carrying elements are selected from at least two different pitch lengths, the ratio of pitch lengths being within a given range of

$$\frac{(2n-3)}{2n-1} : 1.0,$$

$n = 3, 4, 5$ or $6$.

Noise is further modulated by utilizing strings of 3 or more consecutive load carrying elements having substantially the same pitch length. The length and sequential position of the strings modulates the natural load carrying element frequency.

The invention is useful in the design of such apparatus as tread elements for tires, gear teeth, V-belt notching, fan blade spacing, and in other rotating apparatus.

7 Claims, 14 Drawing Figures

MODULATING NOISE PRODUCED BY ROTATING BODIES

This is a division of application Ser. No. 176,460 filed Aug. 31, 1971, now U.S. Pat. No. 3,926,238.

BACKGROUND OF THE INVENTION

This invention relates to pitching and sequencing techniques as applied to rotating apparatus having radially extending load carrying elements spaced apart from one another. The invention more particularly relates to modulating noise produced by the rotating load carrying elements, e.g. individual tire tread design elements contacting a road surface.

As a tire rolls, its individual tread design elements cause air disturbances upon impact with the road, creating a spectrum of audio frequencies broadly referred to as tire noise. Each design element causes a pulse, itself devoid of tone; however, the interaction of all of the pulses creates what is interpreted as the noise. For any given tread design there is associated a particular quantum of energy. Thus, while it is impossible to reduce the amount of energy released by a tire as it strikes a road surface, it is possible and has been the goal of many investigators to reduce the amplitude of the noise producing peaks as displayed by the frequency spectrum of the tire and to distribute this energy over a wide frequency band, i.e. to approach "white noise."

Various methods have been employed in the past to reduce noise generated by tires, particularly tires having transverse tread portions such as snow tires. A common expedient has been to use a variety of different pitch lengths for the tread design elements. It has also been common to utilize random or sinusoidal sequencing of the pitches in an attept to modulate the objectionable noise producing frequencies. While representing an improvement over unpitched (i.e. equally spaced) tread designs, certain significant drawbacks are apparent. One such drawback is that the tire molds become increasingly more expensive to manufacture as the number of different sipe elements increases, requiring a large expenditure for forming and bending dies to produce the necessary sheet metal stampings. Also, the randomness of the pitching sequence requires the use of relatively large, e.g. 180° mold segments which increases the cost of the hand carved models from which the molds are made. Another drawback with these traditional pitching methods is that the tread frequency, equivalent to the product of the tread frequency harmonic and the rotation speed of the tire, is prevalent as a relatively high amplitude naked peak creating an objectionable noise.

It has been another characteristic of the prior art to employ mathematical methods for tuning out certain critical frequencies of a tire's noise spectrum by usually using an iterative process adapted to be solved with the aid of a computer program. The method customarily involves shifting particular tread elements to shift the corresponding critical peak frequencies to an adjacent "hole" frequency, thus leveling out and modulating the noise spectrum. Such a method is described in the publication. "Quieting Noise Mathematically — It's Application to Snow Tires," S.A.E. paper No. 690520.

The state of the art is further exemplified by the tire tread construction technique shown in U.S. Pat. No. 3,023,798 to Moore et al.

It is a primary object of the invention to reduce noise generated by rotating apparatus having radially extending load carrying elements which produce audible noise frequencies, namely by utilizing a particular pitch ratio between load carrying elements.

It is another object to modulate noise produced by rotating apparatus having load carrying elements by pitching the load carrying elements and utilizing sequences of these pitches of such length and sequential positioning to modulate the load carrying element frequency harmonic produced upon rotation of the apparatus.

It is still another object to utilize a minimum number of pitch lengths, preferably two, for use in a tire tread element to reduce cost and improve the frequency spectrum produced by a tire impacting a road surface.

These and other objects are met and the disadvantages of the prior art are overcome by utilizing the apparatus and method of the present invention as more particularly described hereinafter.

SUMMARY OF THE INVENTION

The noise spectrum produced by spaced rotating load carrying elements of a rotating apparatus is modulated by providing the apparatus with discrete pitch lengths in which the ratio of pitch lengths falls within the open intervals defined by the boundary nodal points $$\frac{(n-1)}{n}, 1.0,$$

($n$ being an integer selected from 2, 3, 4 or 6), and excluding the ratios defined by the boundary nodal points. Further modulation is obtained by sequencing the individual pitches in such a manner that the sequence is characterized by a plurality of strings of the load carrying elements, each string consisting of at least three consecutive load carrying elements of substantially identical pitch length. The length and sequential positioning of the strings are selected to modulate the load carrying element frequency harmonic which is produced upon rotation of the apparatus.

The invention has a number of applications, including in V-belt notching, machine tool cutters, circular saw blades, fan blade spacings, gear tooth spacing, and snow tire tread spacing design. In each of these applications, the apparatus consists generally of a member having more or less radially extending and spaced rotatable load carrying elements rotating about one or more axes.

BRIEF DISCUSSION OF THE DRAWINGS

The invention will be more readily understood by reference to the accompanying drawings, in which like numerals designate like parts in the several figures, and wherein.

PREFERRED EMBODIMENTS OF THE INVENTION

As a tire tread element contacts a road surface, it can be shown that the only frequencies generated by the tread elements are those which are integer multiples of the tire rotation speed. If the tire rotates at 10 revolutions per second, then all of the frequencies in the spectrum will be multiples of 10 cycles per second. These multiples are called harmonics. Thus, in traditional tread designs where equal spacing (no pitching) was used, all of the individual lugs or pitches contributed to one frequency which produced an exceedingly loud noise. This one frequency has been found to be equivalent to the total number of lugs disposed circumferentially about one rib of the tire multiplied by the rotation speed of the tire. Thus, if the tire is composed of 50 lugs equally spaced about the tire, a very annoying frequency at the 50th harmonic will be heard. At the opposite end, if it were possible to space the design elements such that each element contributed its energy to a different frequency, a quiet, well-tuned tire would result. This ideal noise pattern is termed "white noise" with all harmonic amplitudes at an equal height. Practically, such an ideal spectrum is unattainable due to other predetermined tread and mold design limitations.

Thus, a compromise must be struck between the whining or whistling sound produced by an untuned tire and the "hishing," background blending sound produced by the ideally tuned tire. It has been found that the most practical way to generate a tread spacing design has been the trial and error method such as provided by a computer program adapted for use with a computer terminal connected into a time-sharing computer system. A tread element sequence and pitching ratio may be analyzed according to its corresponding frequency distribution output or spectrum in a matter of minutes. The use of such a computer program significantly speeds up testing and evaluation of sequences and pitching ratios prescribed by the present invention. Such a computer program may involve the principal that one harmonic is examined at a time and each tread element is evaluated for its contribution to that frequency. The program, in turn, may be advantageously based upon the sine and cosine series developed by Fourier. It has been found that the use of such a mathematical analysis simulates very closely the actual frequency spectrum as produced by a tire on a road surface.

Tread design criteria which will be enumerated hereinafter will be illustrated by considering a tire having only two pitch lengths of the tread design elements. It should be understood that the invention is not intended to be so limited, and in general, applies to tires containing a plurality of pitch lengths. For instance, some tread designs using two basic lengths may advantageously employ a third, intermediate pitch length to smooth the transition between long strings of short and long pitches, respectively. This intermediate pitch improves aesthetics and simplifies design of the tread pattern. However, it has been found quite preferable to employ only two pitches, the advantages including reduced mold costs, simplicity of design, the ability to use shorter string lengths than with a greater number of pitches, and to employ a greater number of different string lengths creating greater noise dispersion.

According to the invention, it has been found that there exists a critical relationship between the pitch lengths of the two differently pitched design elements comprising the tire tread design. Specifically, the pitch ratio of the two design elements must be maintained within specified critical ranges. These ranges are defined as the open intervals between successive boundary nodal points given by the relation $$\frac{(n-1)}{n} : 1.0,$$

$n$ being an integer selected from 2, 3, 4, 5 or 6. Thus, the pitch ratio between design elements must avoid the ratios (½):1.0, (⅔):1.0, (¾):1.0, (4/5):1.0, and (5/6):1.0. Ranges above (5/6):1.0 are unacceptable because these ratios tend to unduly narrow the bandwidth about the tread frequency harmonic. This narrow bandwidth of frequencies about the tread frequency evidences itself in the form of objectionable noise. In contrast, the smaller pitch ratios produce broader bandwidths about the tread frequency resulting in a desirable modulation of the noise produced in the vicinity of the tread frequency harmonic.

When the pitch ratio of the design elements is approximately $$\frac{(n-1)}{n} : 1.0,$$

as noted above, there will be a very loud frequency equivalent to:

$$F = ((n-1)S + nL)R \qquad 1.$$

where,
 $F$ = frequency in $H_z$
 $R$ = tire revolutions per second
 $L$ = number of long tread design elements
 $S$ = number of short tread design elements It is to be understood that harmonic frequencies attributable to the undesirable nodal pitch ratios $$\frac{(n-1)}{n} : 1.0$$

are affected solely by the specific pitch ratio and not by sequencing of the pitches or lugs.

While it is necessary only to avoid the nodal points giving a pitch ratio of $$\frac{(n-1)}{n} : 1.0,$$

it is more preferred to optimize the split in noise energy between any two adjacent nodal frequencies. Thus, the maximum improvement for modulation of frequency peaks attributable to nodal points is attained by utilizing design elements in which the ratio of the shorter tread element to the longer tread element is approximately $$\frac{(2n-3)}{2n-1} : 1.0,$$

$n = 3, 4, 5$ or $6$. However, it is quite suitable to employ a pitch ratio within the range of about one-half of the distance from the preferred ratio of $$\frac{(2n-3)}{2n-1} : 1.0,$$

to each adjacent nodal point, and more preferably, the ratio of shorter pitch to longer pitch is $$\frac{(2n-3)}{2n-1} : 1.0,$$

± 20% and most preferably ± 5% of the distance to the next immediate boundary points. These optimum ratios are, respectively: (3/5):1.0, (5/7):1.0, (7/9):1.0, and (9/11):1.0.

It is an additional feature of this invention to provide a unique sequencing scheme for positioning the different design element pitches circumferentially about the tire tread. It has been customary in the past to employ randomized or sinusoidal pitch sequencing in an effort to gain additional frequency modulation. Characteristic of this practice has been the use of a number of pitch lengths and short string lengths. By string length is meant the number of consecutive design elements that have substantially identical pitch lengths, taking into consideration manufacturing tolerances to allow for slight variance in the length of the design elements of a particular string. It has been found, according to the present invention, that the use of strings of at least 3 and more preferably of at least 4 consecutive design elements having substantially identical pitch lengths will greatly aid in the modulation of the tread frequency harmonic. The choice of length, as well as the sequential positioning of the strings about the circumference of the tread can be optimized through testing (such as by utilizing the computer program above mentioned) to increase the flattening or modulation of the tread frequency harmonic. It is preferred that at least three different string lengths are employed for any given complete sequence. Choice of the length of the strings, for instance, will be dictated in part by the pitch ratio. Specifically, higher pitch ratios, e.g. 0.82:1.0, require relatively long strings such as seven to ten consecutive design elements to effectively modulate the tread frequency harmonic. In turn, lower pitch ratios such as 0.6:1.0 demand shorter string lengths such as four to five consecutive design elements of equal length. The optimum length and sequential positioning of these strings can be readily determined by those skilled in the art.

In choosing a particular sequence of pitches, it has been found that in general, short strings will reinforce the tread frequency harmonic and long strings will tend to reinforce the extremes of the tread frequency bandwidth.

Figures 1, 2:
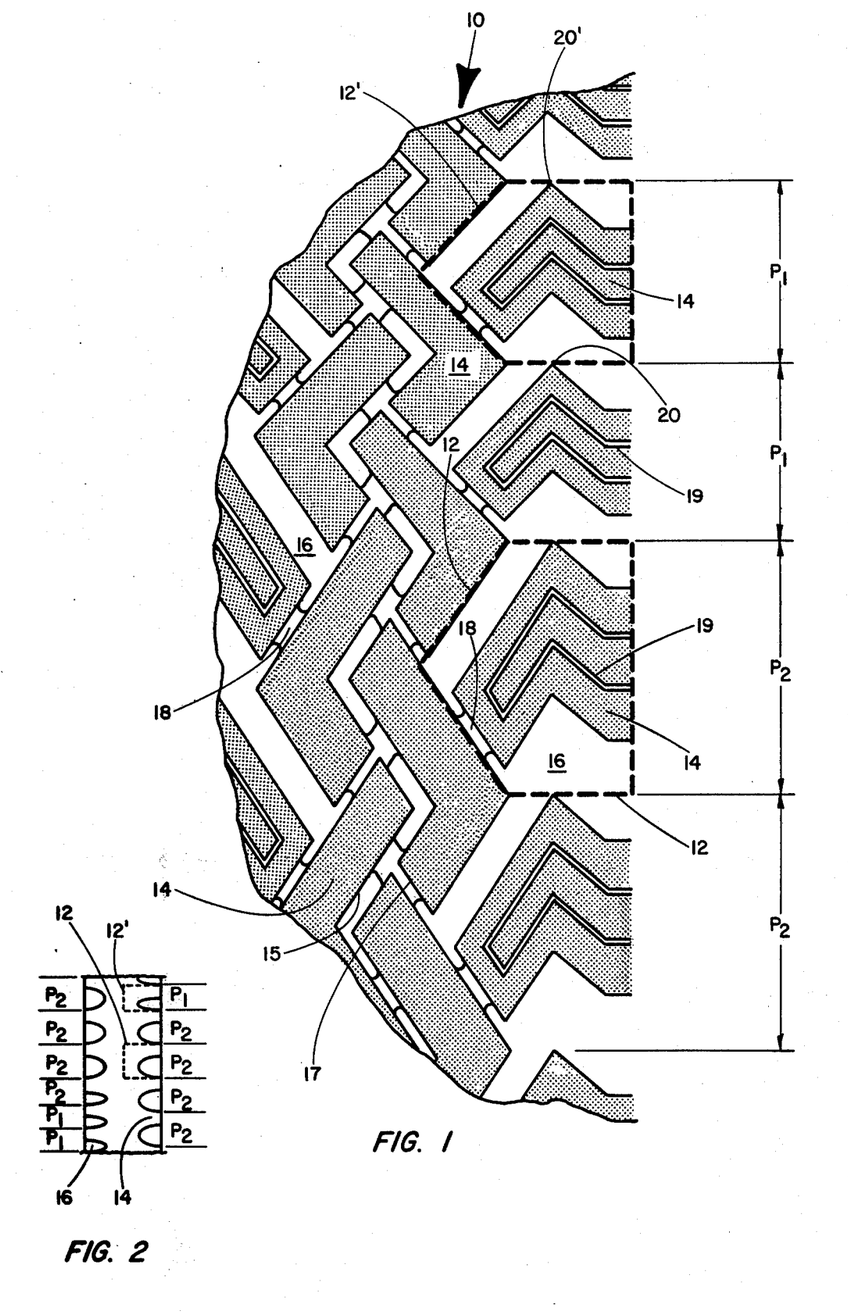
FIGS. 1 and 2 schematically depict fragmentary sections of tire tread elements having two pitch lengths in a particular ratio according to the invention.

In order to better illustrate the invention, reference is made to the accompanying drawings. In FIGS. 1 – 2 there is shown a tread portion generally designated at 10, which covers a tire casing (not shown) formed in any of a wide variety of forms of construction well known in the art, such as rubberized fabric or cord plies arranged in a number of layers. The outer or resilient rubber-like tread portion can be composed of a number of design portions such as indicated within the boundaries 12 and 12', the general shape of the design portion repeating itself circumferentially about the tire. Each of the design elements or pitches 12 and 12' as well as the longitudinally running ribs 15 and 17 are composed of radially outwardly extending lug portions 14, adjacent grooves 16, sipes 19 and interconnecting fillets 18, the latter provided along the bottom of a sipe or groove in known manner for the purpose of reinforcement and to prevent cracking. As shown, each tread design element may vary in shape or be staggered transversely across the tread, if desired. In the circumferential or longitudinal direction, however, the design elements 12 and 12' have a characteristic pitch length, in this case, pitch lengths $P_2$ and $P_1$, respectively. A portion of the pitching sequence is shown in each of FIGS. 1 and 2. The pitch length for these particular tread designs are measured from the leading edge 20 of the lug portion of a design element to the leading edge 20' of the succeeding design element.

Figure 3A:
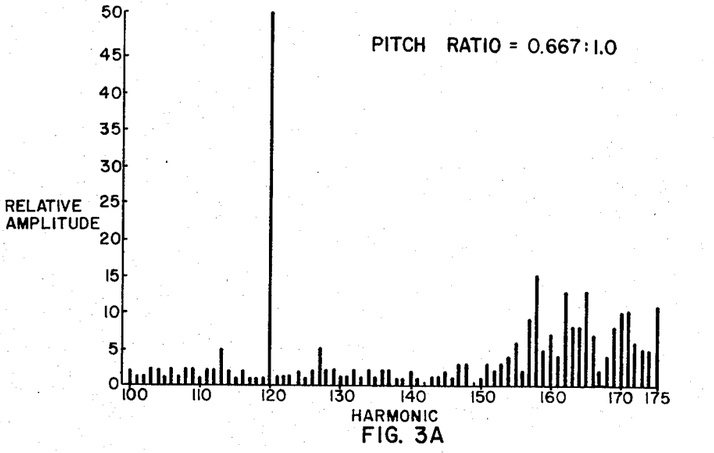
FIGS. 3a–3c depict in graphic form the predicted form of the frequency response spectrum generated by three two-pitched snow tires having different pitch ratios.
Figure 3B:
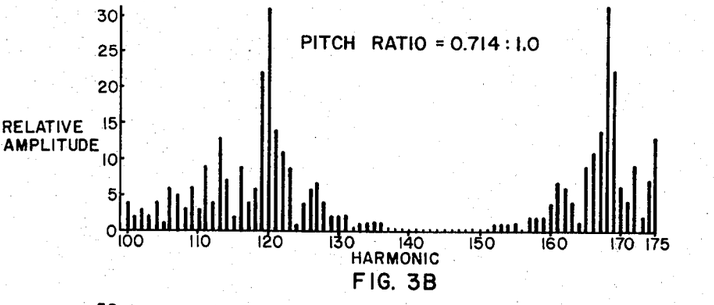
Figure 3C:
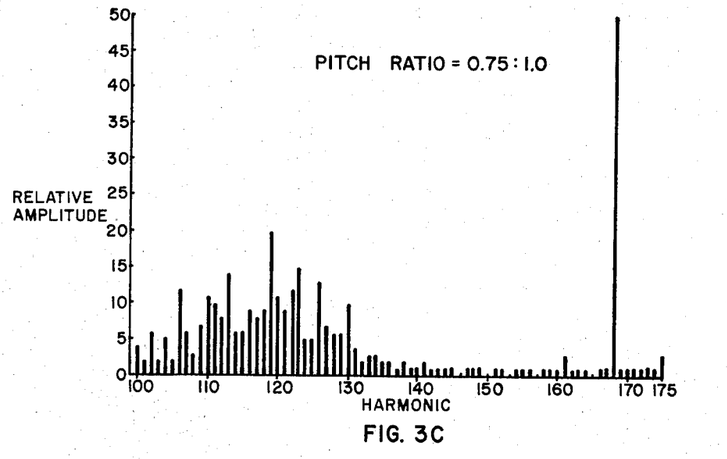

In FIG. 3, a comparison is made between a 48 pitched tread element having a pitch ratio of the smaller pitch length to the longer pitch length according to the invention (FIG. 3b, pitch ratio of 0.714:1.0) and similarly 48 pitched tread elements having adjacent nodal points ratios (FIG. 3a, pitch ratio of 0.667:1.0; FIG. 3c, pitch ratio of 0.75:1.0). 24 pitches are of the shorter length and 24 are of the longer length. The corresponding predicted frequency spectrums are shown between the 100th and 175th harmonics, the area of interest. (Below the 100th harmonic, pitch ratio differences are not reflected in the frequency spectrum in these cases; above the 175th harmonic, cycling occurs and the tones are not as audible to the human ear as the lower harmonics). According to equation (1) above one would predict for FIG. 3a an objectionable peak harmonic of $(n - 1) S + nL = (3 - 1) \times 24 + 3 \times 24 = 48 + 72 = 120$. For FIG. 3c one would similarly predict that an objectionable peak harmonic would occur of the 168th harmonic. These peaks are shown in the figures. They produce loud tones upon rotation of the tire, not only because of their high amplitudes, but also because of their relative "nakedness," i.e. there do not exist harmonics in the close vicinity of the peak harmonic of sufficiently high amplitude to modulate the tones produced. In comparison, FIG. 3b possesses a modulated spectrum, the peaks at 120 and 168 being tolerable because of lower amplitude and the presence of adjacent harmonics of sufficient amplitude to produce, in effect, a desirable bandwidth of harmonics. In each of FIGS. 3a, 3b, and 3c identical pitch sequencing was utilized.

Figure 4:
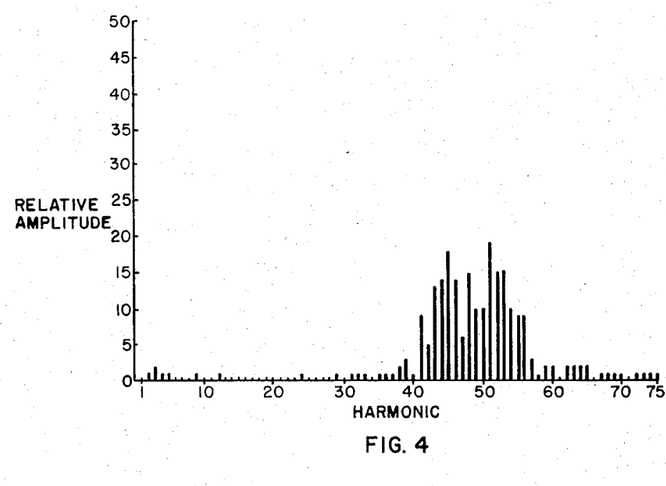
FIG. 4 shows the tread frequency band produced by a two pitched tire having too high a pitch ratio.

FIG. 4 illustrates the effect of too high a pitch ratio in a 48 pitched tire having 2 pitch lengths of 24 pitches each. The ratio of pitch lengths is 0.84:1.0, above the preferred range according to the invention. The objectionable feature of the frequency spectrum is the narrow bandwidth about the tread frequency harmonic (the 48th, equal to the number of pitches). The tread frequency band is shown as extending from about the 41st harmonic to about the 57th harmonic. In the vicinity of the tread frequency harmonic (or load carrying element harmonic, in general), a narrow bandwidth will produce an objectional tonal noise. As previously mentioned, this bandwidth can be made wider by using a pitching sequence containing relatively long strings of pitches. Such a sequencing technique was used in FIG.

4 and still the bandwidth, while much improved, could not be widened appreciably more than shown.

Figure 5A:
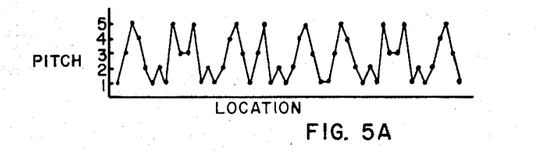
FIGS. 5a and 5b illustrate a prior art type of random pitch sequencing and frequency response.
Figure 5B:
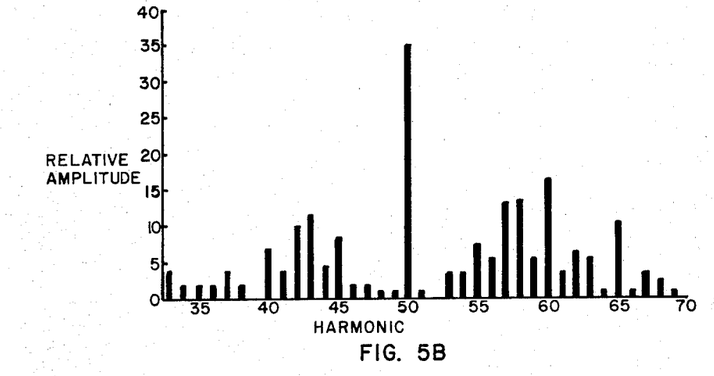

FIG. 5 illustrates a typical prior art pitch sequencing scheme for a 50 pitched tire. Five different pitch lengths are used and labeled as follows: 1 = 0.9; 2 = 1.0; 3 = 1.1; 4 = 1.2; 5 = 1.3. The sequence is shown in FIG. 5a. Note the short string lengths of one or two consecutive design elements. The frequency spectrum is shown in FIG. 5b; note the strong, deleterious peak at the tread frequency (50th) harmonic.

Figure 6A:
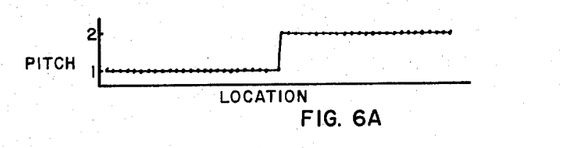
FIGS. 6a–6b, 7a–7b and 8a–8b 8B compare in graphic form predicted frequency spectrums produced by well pitched tires using varied sequential lengths and positioning of tread design elements.
Figure 6B:
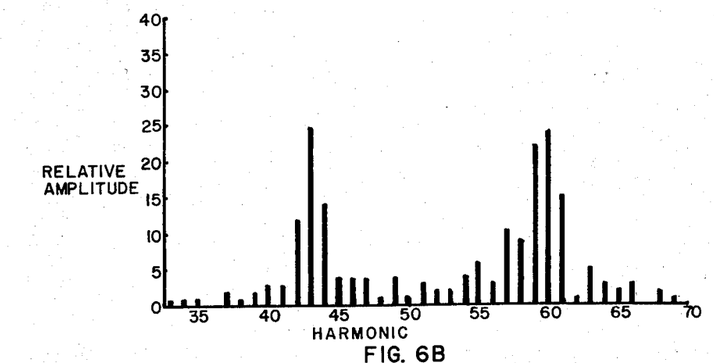
Figure 7A:
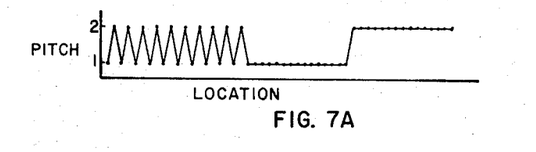
Figure 7B:
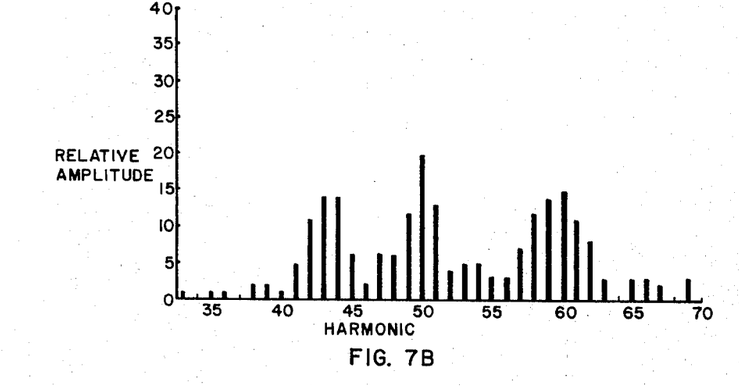
Figure 8A:
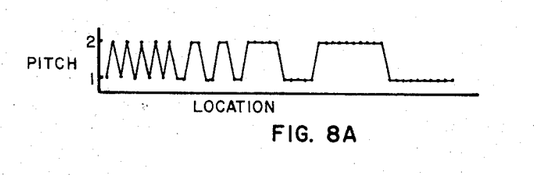
Figure 8B:
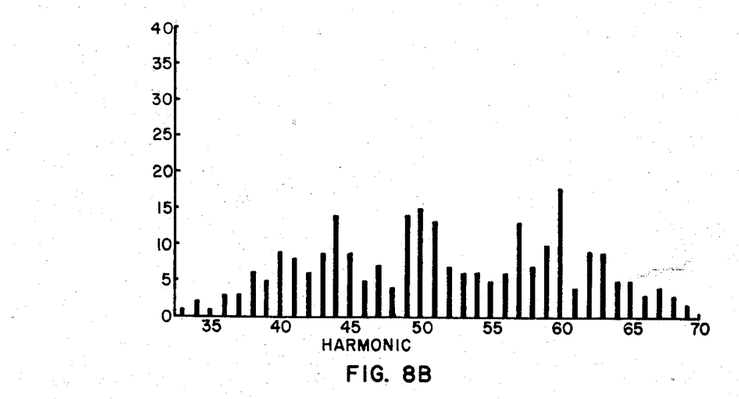

FIGS. 6 – 8 illustrate the combined use of a preferred pitch ratio (0.72:1.0) and the effect of various pitch sequences as applied to a 50 pitch snow tire. In each of FIGS. 6a, 7a, and 8a, "1" denotes the shorter pitch length and "2" the longer pitch length. In FIG. 6a, two 25 length strings are employed; this produces a wide bandwidth about the tread frequency harmonic as shown in FIG. 6b, but with relatively high amplitude, non-modulated peaks. In FIGS. 7a and 7b, a refinement is obtained by employing the sequence consisting of a set of alternating pitches to build up the tread frequency harmonic area, and a set of long strings (15 in length each) to increase the bandwidth. A further refinement is shown in FIGS. 8a and 8b in which a mixture of short, intermediate and long strings are employed. A satisfactory degree of modulation results.

Predicted results using the preferred pitch ratio and sequencing according to the invention have been born out using noise analyzers for measurement of noise produced by a tire rotating upon a driven metal wheel surface. The correlation with the predicted results has been quite good, despite background noises and low sensitivity of the noise analyzing recorder. The predicted results have also been corroborated in actual driving tests. In one such test a Ford Bronco was equipped with a set of traction snow tires having the tire tread sequenced according to the invention. Another set of snow tires (commercially available) of the same tread style but having random pitches of three different lengths and random sequencing (without long strings) was also tested. Qualitatively, the tires made according to the invention were much quieter overall, and particularly when slowing down and rounding gradual curves.

While the invention has been explained in particular with reference to use in tire tread design, it generally applies to rotating apparatus having radially extending (both outward and inward) spaced load bearing elements. An automotive fan would be one example of such an apparatus; the blades of the fan and space between blades would collectively define a design element which would be pitched and sequenced according to the invention. The invention is also advantageously applied to spacing of notches in V-belts. As is well known in the art, V-belts provided with transversely extending notches along its inner circumference or undercord enables the V-belt to more easily bend about a small diameter sheave. As a portion of the belt engages a sheave, the sides of the notches impact the contiguous driving and driven sheave surfaces creating noise much like a tire tread element striking pavement. Accordingly, the notching is accomplished using the preferred pitch ratios and/or sequencing of the present invention, the pitch lengths being measured between successive leading edges of the notches.

The invention is capable of a variety of modifications and variations which will be made apparent to those skilled in the art by a reading of this specification. All such modifications, variations and other equivalents are to be included within the scope of the invention as defined by the claims appended hereto.

What is claimed is:

1. A method for producing a design element length and spacing pattern for a rotatable body divided into a plurality of such design elements, said design elements having at least two different pitch lengths and extending circumferentially about the rotatable body, said method comprising:

selecting relative pitch lengths of the design elements such that the ratio of shorter pitched elements to longer pitched elements is $$\frac{2n-3}{2n-1} : 1.0,$$

$n = 3, 4, 5$ or 6, plus or minus one-half the distance to an adjacent nodal point ratio defined by the relation $$\frac{n-1}{n} : 1.0,$$

$n = 2, 3, 4, 5$ or 6;

forming a patterned sequence of the design elements in which the sequence is characterized by comprising in at least a portion thereof of a plurality of strings of design elements, each string consisting of at least three consecutive design elements of substantially identical pitch length;

generating and displaying a simulated noise spectrum distribution of the sequence of design elements, the distribution comprising a series of peaks of particular individual amplitude corresponding to each harmonic frequency at the band of frequencies in question; and modulating and flattening the distribution by varying the length and sequential positioning of said strings, using shorter string lengths with smaller pitch ratios to reinforce the natural design element frequency harmonic, and longer string lengths with larger pitch ratios to modulate the natural design element frequency harmonic and to reinforce the extremes of the natural design element frequency bandwidth.

2. The method of claim 1 wherein the ratio of shorter pitch length to longer pitch length is $$\frac{2n-3}{2n-1} : 1.0,$$

plus or minus 5 percent of the distance to the next immediate boundary nodal point ratio.

3. The method of claim 1 wherein only two different pitch lengths are employed, and wherein the ratio of the two pitch lengths is approximately $$\frac{2n-3}{2n-1} : 1.0,$$

$n = 3, 4, 5$ or 6.

4. The method of claim 1 wherein said strings consist of at least four consecutive design elements of substantially identical pitch length.

5. The method of claim 1 wherein a further step comprises employing at least three different string lengths for any complete sequence of design elements.

6. A method for producing a tire comprising producing a tread configuration produced from mold segments utilizing pitching and sequencing of design elements reflected within the mold segments obtained by the method of claim 1.

7. A method for producing a notched V-belt for power transmission, comprising producing a V-belt having notches disposed along the radial inner surface of the belt to define spaced design elements in which the notch spacing and pitch length of the design elements is determined utilizing the method of pitching and sequencing the notched elements in accordance with the method of claim 1.

* * * * *